United States Patent [19]
LaBounty et al.

[11] Patent Number: 5,284,283
[45] Date of Patent: *Feb. 8, 1994

[54] RAIL PROCESSOR

[75] Inventors: Roy E. LaBounty; Kenneth R. LaBounty, both of Two Harbors, Minn.

[73] Assignee: LaBounty Manufacturing, Inc., Two Harbors, Minn.

[*] Notice: The portion of the term of this patent subsequent to Jul. 7, 2009 has been disclaimed.

[21] Appl. No.: 773,157

[22] Filed: Oct. 8, 1991

Related U.S. Application Data

[63] Continuation-in-part of Ser. No. 592,530, Oct. 4, 1990, Pat. No. 5,127,567.

[51] Int. Cl.$^5$ ............................ B23P 17/02; B26F 3/00
[52] U.S. Cl. ...................... 225/96.5; 225/103
[58] Field of Search .................. 225/96.5, 103

[56] References Cited

U.S. PATENT DOCUMENTS

| | | | |
|---|---|---|---|
| 4,558,515 | 12/1985 | LaBounty | 30/228 |
| 4,720,032 | 1/1988 | LaBounty | 225/103 |
| 5,127,567 | 7/1992 | LaBounty et al. | 225/96.5 |

Primary Examiner—Hien H. Phan

[57] ABSTRACT

A rail breaker attachable to the boom structure and hydraulic system of a hydraulic excavator and having an elongate frame tiltable by a hydraulic cylinder of the excavator, a grapple and a swingable breaker arm on the outer end of the frame directed toward the excavator, the grapple having a width to grasp and clamp a length of the rail to immobilize the rail, the lower stationary jaw of the grapple having a hardened fulcrum blade over which the rail is broken, the upper jaw of the grapple having a nicking blade to put a nick in the rail to be broken, and the breaker arm swinging against the extended portion of the rail which is being clamped by a grapple to break the rail at the nick produced and over the fulcrum blade.

20 Claims, 2 Drawing Sheets

RAIL PROCESSOR

This application is a C-I-P of co-pending, co-owned U.S. patent application Ser. No. 592,530, filed on Oct. 4, 1990 of same inventorship, now U.S. Pat. No. 5,127,567.

This invention relates to an improved rail breaker or processor as an attachment for a hydraulic machine.

BACKGROUND OF THE INVENTION

Railroad track rails are made of a high carbon steel which makes the tracks more brittle than many other types of steel, such as used in I-beams and columns in building structures. Such track rails can be torn up and reclaimed when a section of railroad track is abandoned, but in order to conveniently handle such tracks, they must be reduced in size to lengths that are manageable to be easily hauled. Accordingly, the long lengths of rail must be reduced in size to four or six foot lengths, or other reasonably short lengths so that they can be easily picked up by grapples and other types of machinery and loaded into railroad cars or trucks, or other hauling and handling facilities.

There have been prior devices for breaking rails into shorter lengths and in some instances such devices have been intended to be attached to the boom structure of a hydraulic machine or excavator. For instance, U.S. Pat. No. 4,720,032 discloses such a portable rail breaker capable of holding a rail, producing a notch or nick in one side of the rail and then breaking off a length of the rail over a fulcrum; but the rail breaker disclosed in the patent makes the handling of the rail cumbersome at best. Another device is disclosed in U.S. Pat. No. 4,439,921 which comprises a rail breaking attachment for backhoes. Again, this device makes the handling of rails extremely cumbersome, and it appears that operation of the device creates substantial safety problems due to the flying of broken rail parts.

Other rail breakers are illustrated in U.S. Pat. Nos. 4,522,323; 4,346,828; and 4,444,345. All of these disclosures facilitate handling the rail by simply sliding the rail along its length, but without any other efficient means of manipulating the rail. Each of the foregoing three patents operate by producing a nick or a notch in the rail and then breaking off the rail at the notch produced. Similarly, the rail lifting and cutting machine in U.S. Pat. No. 4,383,630 receives the rail by sliding and then simply breaks the rail over a fulcrum, and without nicking the rail.

Other patents which disclose nicking a rail and then breaking it are three Russian patents, SU-602-320; SU-941-027; and SU-831-430. U.S. Pat. No. 344,735 discloses the process of nicking the rail in a longitudinal direction so as to facilitate breaking the head away from the base.

Other marginally relevant patents relating generally to performing functions with track rails are U.S. Pat. Nos. 1,430,916; 2,309,262; and 3,680,486; 3,802,731; 4,519,135; and 4,558,515.

SUMMARY OF THE INVENTION

An object of the invention is to provide an attachment for a mobile machine, such as a hydraulic excavator, for breaking track rails and other long pieces of heavy rigid steel into short lengths that can be easily loaded and transported for recycling.

A feature of the invention is an attachment tool to be mounted on and connected to the boom and hydraulic system of a hydraulic excavator and which has a pair of relatively movable clamping jaws directed in the direction of the excavator cab to grip along a length of an elongate rail. A breaker arm directed generally to the cab is swingably mounted adjacent the clamping jaws to confront a portion of the rail extending from the clamping jaw, and the clamping jaws having a rail nicking or notching blade and a fulcrum portion over which the breaker arm breaks the rail adjacent the nick which has been formed. The clamping jaws and breaker jaws are operated by separate hydraulic cylinders.

The piece of rail being broken off is directed downwardly toward the ground and away from the hydraulic excavator to minimize the possibility of causing injury or damage to persons in or around the excavator or nearby facilities.

Another feature of the invention is the L-shaped arrangement of the supporting faces of the stationary clamp arms and the corresponding L-shaped of the fulcrum blade, which accommodates gathering of a number of rails into a cluster, and in a single operation causing the rails to be nicked and then broken off by the breaker arm which is spaced from the fulcrum blade.

Another objection and advantage of the present rail breaker invention is that it provides for better manipulation and constant visual inspection of the rails and work in progress by the operator of the hydraulic excavator.

Yet another object and advantage of the present rail breaker invention is that it has a greater range of reach or operating positions with respect to the excavator and ground as heretofore not known.

DETAILED SPECIFICATION

Figure 1:
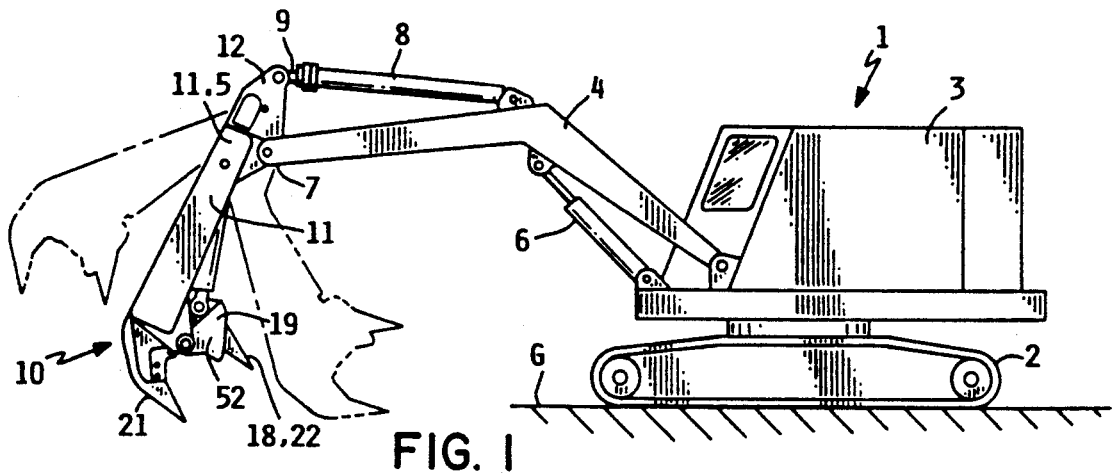
FIG. 1 is a side elevational view of the attachment shown mounted on the boom structure of a hydraulic excavator with various attachment positions in broken outline.
Figure 2:
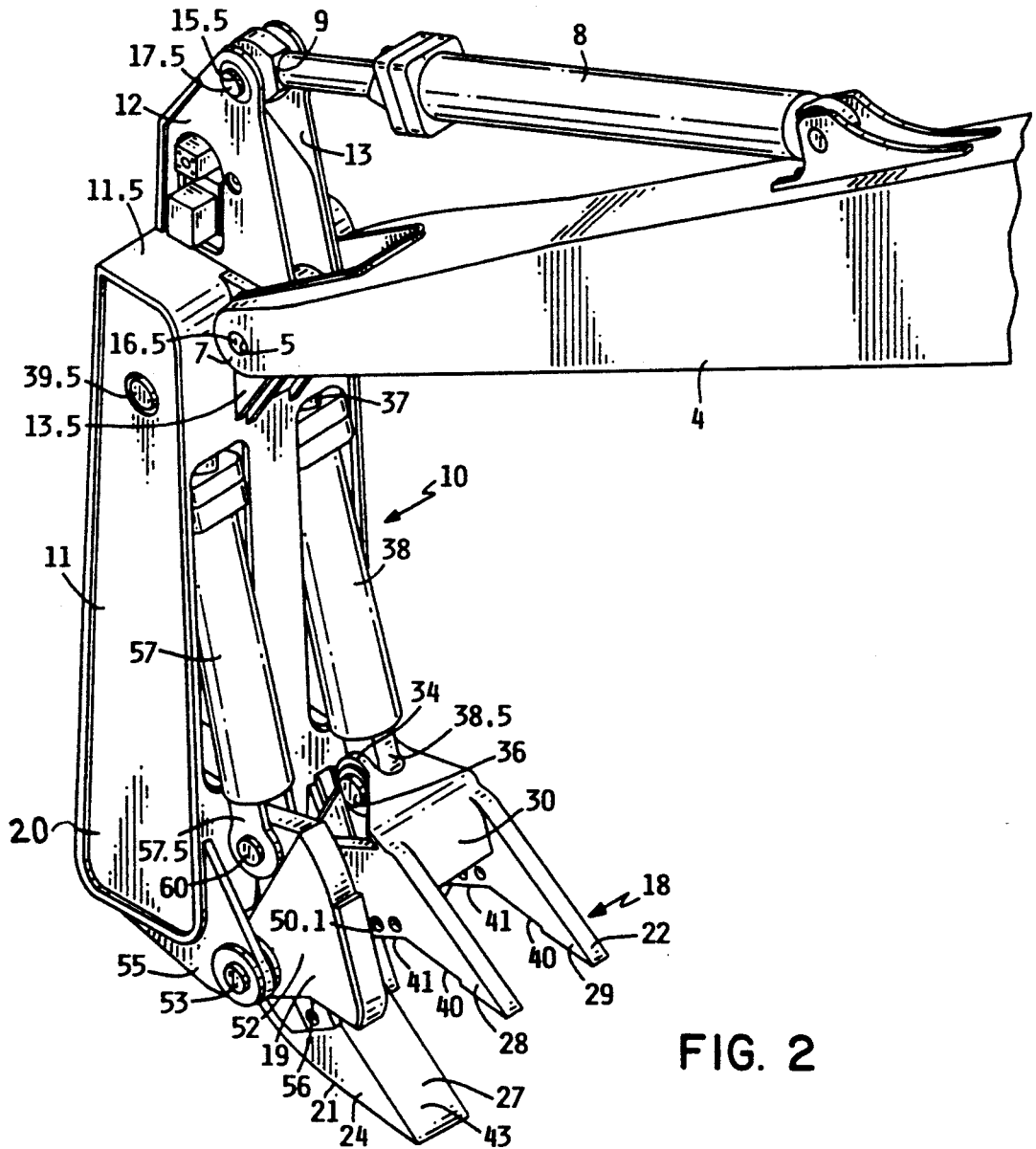
FIG. 2 is a perspective view of the attachment shown mounted on the boom structure, partially broken away, of a hydraulic excavator.

Referring to FIGS. 1-4, one form of the invention is illustrated and described herein, and the rail processor or breaker is indicated in general by the numeral 10. By way of background, a hydraulic excavator or machine 1 is shown sitting on the ground G. Excavator 1 has a track 2 supporting a swinghouse 3 which further supports an extending boom structure 4. The boom structure 4 at its remote or distil end 7 has an attachment mounting aperture 5 thereat. A boom cylinder 6 is connected between the boom structure 4 and the swinghouse 3 as to elevate and lower the boom structure 4. The boom intermediately has mounted thereto an attachment cylinder 8 having an attachment end or piston rod 9 for mounting to the appropriate attachment mounting assembly.

Although the breaking or processing tool 10 is described in terms of a rail breaker or processor, it should be understood that the tool 10 is useful in breaking other elongate hardened steel or similar elements, and accordingly, wherever the term "rail" is used herein, the term is meant to include track rails, but also other types of elongate elements, which may be of a somewhat brittle nature and are to be broken into shorter lengths for ease of handling, are also included.

The improved rail breaker 10 includes an elongate frame 11 which is generally box shaped and suitably internally braced to be rigid. The frame 11 has an attachment mounting assembly comprised of brackets 12 and 13, which are substantially parallel and opposing as well as mere images of each other. Brackets 12 and 13 are fixed, as by welding, on to the frames inner or rear endward portion 11.5.

Brackets 12 and 13 have a reinforcement flange 13.5 supporting the brackets 12 and 13 as they are also welded to the elongate frame 11 and brackets 12 and 13. Brackets 12 and 13 also have in line apertures 14.5 and 15.5 therethrough which will accept pins 16.5 and 17.5 for appropriately mounting the attachment mounting aperture 5 of boom end 7 to the attachment mounting assembly as well as the attachment cylinder 8 at its end or piston rod 9.

The rail breaker 10 also has a grapple 18 and a breaker arm 19 in a side-by-side relation and affixed to the outer or forward endward portion 20 of the frame 11. By this attachment mounting assembly, the grapple jaw portions 18 and breaker arm portion 19 are oriented as to be generally in the direction of the excavator 1 which makes for easy visibility by the operator within the swinghouse 3 and easy grasping of any rails R between the far reach of the boom structure 4 and rail breaker 10 up to the excavator 1.

The grapple 18 includes a stationary lower jaw 21 affixed on the frame 11 and a swingable upper jaw 22 mounted on a pivot pin 23 supported by the two rigid jaw plates or panels 24 and 25 of the lower jaw 21, which plates are affixed as by welding to the frame 11. The jaws 21 and 22 extend generally endways or offset of the elongate frame and from the outer end 20 thereof toward the excavator 1 as shown in the FIGS. A bushing tube 26 is welded to and extends between the two plates 24, 25 and receives the mounting pin 23 therein.

A frame plate 27 extends between and is welded to the jaw plates 24, 25 for strengthening the lower jaw 21. In addition, a rigid tie bar 27.1 extends between and is welded to the lower jaw plates 24, 25 below frame plate 27.

The upper jaw 22 also has a pair of rigid side plates or panels 28 and 29 mounted on the pin 23 so as to be swingable with respect to the lower jaw 21. The jaw plates 28 and 29 are affixed to each other and interconnected by a generally U-shaped reinforcing plate 30, the ends of which are welded to the jaw plates 28, 29.

As more fully disclosed in the copending application Ser. No. 592,530, an additional frame plate may overlie the frame plate 30 and is also welded to both of the jaw plates 28, 29. A pair of additional internal bracing plates may be arranged parallel to the jaw plates 28, 29 and are welded to the frame plate 30. A pair of bushing or mounting plates 34 and 35 (not shown) are welded to frame plate 30, which receive the connector pin and bearing assembly 36 by which the upper jaw 22 is connected to the end 38.5 of hydraulic cylinder 38. The piston of rod 37 of cylinder 38 is connected within and to the frame 11 by pin 39.5. The hydraulic cylinder 38 is powered and controlled by hydraulic fluid under pressure and valves operated in the hydraulic excavator machine 1 of which the boom is a part.

It will be recognized that the width of the grapple 18, i.e., the spacing between jaw panels 28 and 29, and between panels 24 and 25, is of the same general order of magnitude as the spacing between the breaker arm 19 and the grapple 18 The wide width of the grapple 18 is important for immobilizing the rails relative to the grapple during breaking of the rails. The wide spacing between the breaker arm 19 and the grapple 18 provides leverage at the rail in order to create breaking forces on the rail under influence of the breaker arm 19.

The jaw plates 28, 29 have jaw faces 40, 41 which extend obliquely to each other. The lower stationary jaw 21 also has jaw faces 42, 43 which extend obliquely to each other with wear plates 42.5 and 42.7. The jaw faces 40, 43 cooperate with each other in clamping a rail or a cluster of rails R which are to be broken; and the oblique relationship of the jaw faces urge the rails inwardly toward the pivot 23 as the upper jaws are closed onto the lower jaws.

It should be recognized that the fulcrum plates or wear plates 42.5 and 42.7 are generally L-shaped and define rail engaging faces 47, 48 which extend transversely to each other and cooperatively define a substantial V-shaped The rail engaging face 48 is oriented to obstruct movement of the rails R from the fulcrum plate toward the pivot defined by the pin 23.

The upper swingable jaw 22 is arranged so that the jaw plate 28 will swing downwardly along and to the outside of the plate 24. The plate 28 also is recessed adjacent its jaw face 41 to define a blade seat to mount the replaceable hardened steel nicking blade 43.5 which is located opposite the fulcrum blade 42.5, but slightly offset form the fulcrum blade. The nicking blade 43.5 has a sharpened edge 51 which protrudes slightly below the jaw face 41 of the upper jaw plate 28. The nicking blade 43.5 is formed of high carbon, extremely hard steel, and is held on the jaw plate 28 by a plurality of bolts 50.1 so that the nicking blade 43.5 can be readily replaced when it becomes worn. Plate 29 is also recessed adjacent its jaw face 41 to define a seat to mount replaceable hardened steel blade insert 43.7 which is located opposite but slightly offset from wear plate or blade 42.7.

The jaw plate 28 may have a stiffening plate welded against the outer face of plate 28 adjacent the nicking blade and the seat which is recessed into the plate 28. Such a stiffening plate serves to stiffen the plate 28 where metal was cut away in order to define the seat.

Figures 3, 4:
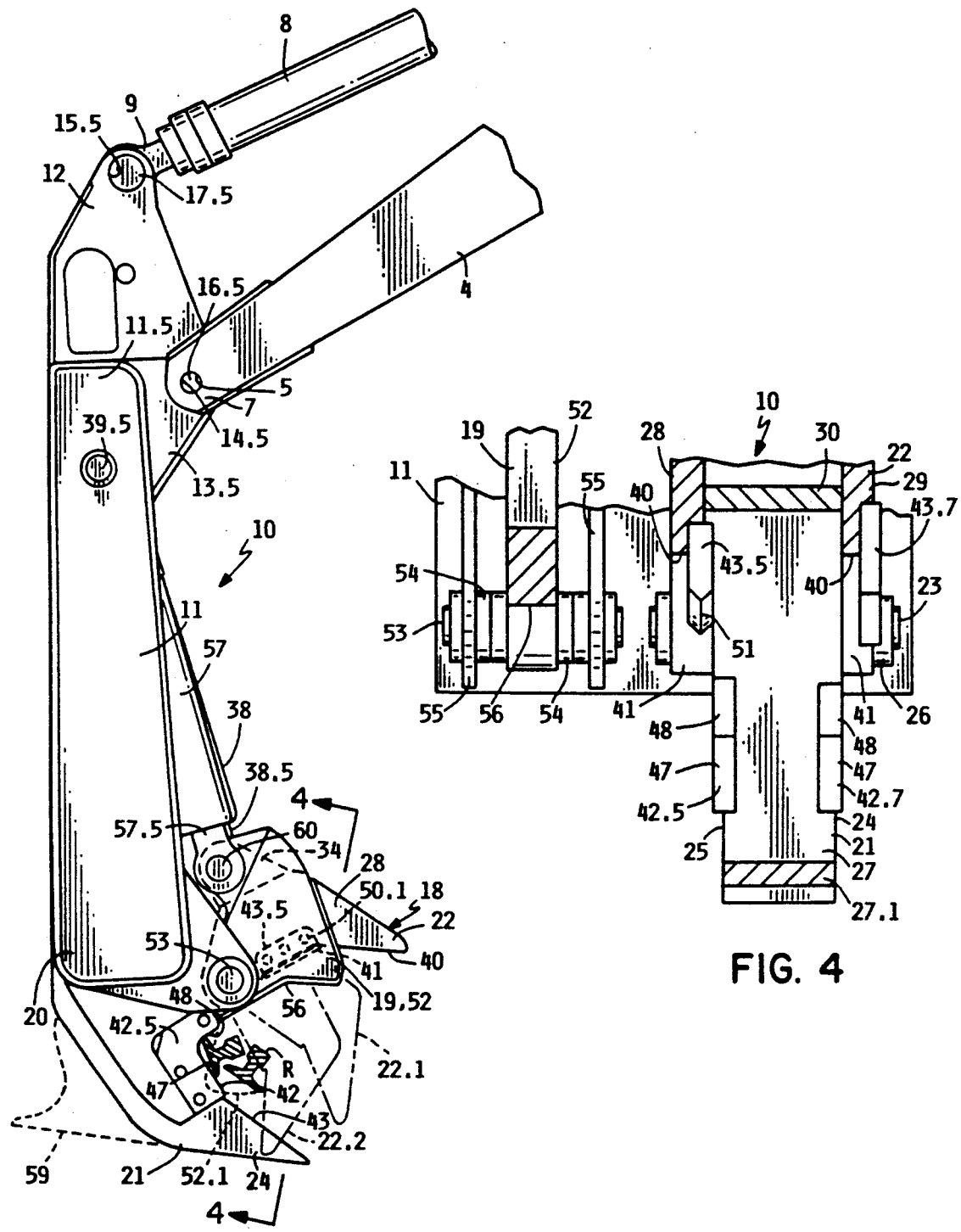
FIG. 3 is a side elevation view of the invention mounted on the boom structure.
FIG. 4 is an enlarged detail sectional view partially broken away taken approximately at 4—4 of FIG. 3.

With reference to FIG. 3, the upper jaw 22 is shown, in full lines, in its fully open position; and FIG. 3 shows two shifted positions of the upper jaw in dashed lines, the first shifted position is being indicated by the numeral 22.1 showing the jaw in a partially closed condition for grasping the rails as illustrated, and an additional shifted position is indicated by the numeral 22.2 which illustrates that the outer end of the upper jaw bypasses the outer tip ends of the lower jaw as the rails are clamped under pressure by blade or plate inserts 42.5, 42.7, 43.5 and 43.7.

The breaker arm 19 includes a rigid plate 52 which is mounted independently of the grapple 18 and is supported by a pivot pin 53 mounted in bearing tubes 54 supported by bracket plates 55 which are affixed as by welding to the frame 11. The mounting pins 53 of the breaker arm and pin 23 of the grapple 18 are aligned with each other and their axes are co-linear. The breaker arm plate 52 has a broad, but curved face 56 as to traverse the rail or rails supported on the lower grapple jaw. In FIG. 3, a shifted position of the breaker arm plate is illustrated by the dotted lines 52.1, to show the relationship to the fulcrum plate 42.5 when the breaker arm 19 is fully swung to its nearly maximum position. The breaker arm plate 52 is operated by a separate hydraulic cylinder 57, the breaker arm plate 52 is connected to the end 57.5 of hydraulic cylinder 57 by a pin and bearing assembly 60 on the end 57.5 of the cylinder 57. The piston rod 58 is connected within and to the frame 11 by pin 39.5. The hydraulic cylinder 57 is connected by hydraulic hoses and valves to the hydraulic system of the hydraulic excavator to be controlled from the cab of the machine.

By mounting cylinders 38 and 57 with piston rods 37 and 58 enclosed by frame 11, the rods are protected. Otherwise, the rods 37 and 38 would be susceptible to nicking which may result in the degeneration and leakage of cylinders 38 and 57. By this arrangement, rail breaker 10 and its hydraulics will have a long life.

The lower jaw plates 24 and 25 may have rigid hook shaped extensions 59 protruding rearwardly and away from the plates 24 and 25 for raking rails out of a pile or off ties to render them more accessible to be picked up by the grapple 18.

In the operation of the rail breaker or processor 10, the frame 11 and grapple 18 will be positioned as illustrated in FIG. 1, so that the grapple 18 can pick one or a number of rails R off the ground G or out of a pile of rails. A skilled operator of the machine can easily pick up three rails which can be processed simultaneously. It has been experienced with the rail breaker 10 that three rails classified as 130 pounds rails can be simultaneously processed and broken into short lengths. Of course, small or lighter weight rails used with small trains and from various other sources can also be broken into short lengths through the use of this rail breaker 10.

It has been found helpful, but not necessary, to use a platform or a pallet in the scrap yard adjacent the pile of rails as to support, temporarily, those rails which are being processed into smaller pieces. A cluster of three rails may be grasped by the grapple 18 and placed upon such a pallet or table. Then by opening the jaw and swinging the rails breaker to the side, that is by swinging the boom structure 14 and swinghouse 3 of the backhoe or excavator 1 to the side, the grapple 18 may be moved along the length of the rails being processed so that initially the grapple will clamp the rails at a location six to ten feet from the end of the cluster of rails. When the grapple 18 clamps down on the cluster of rails, the rails are drawn together in a tight cluster and it has been found that the nicking blade 50 will engage and produce a nick in more than one of the rails at the same time. As the upper jaw 22 is clamped down onto the rails, the rails are pressed firmly against the jaw faces 41, 42 and particularly against the rail engaging face 47 of the fulcrum blade 42.5. In this position, the cluster of rails are firmly clamped while the breaker arm 19 is operated. The cylinder 57 is extended to swing the breaker arm 19 toward the dotted line position 52.1 thereof. When the rail engaging face 56 of the plate 52 engages the rails, the breaker arm 19 continues to swing and the rails will be broken off over the fulcrum blade 42.5 and closely adjacent the nick produced by the nicking blade 43.5 and edge 51. This occurs while rails R are tightly held by inserts or blades 42.5, 42.7, 43.5 and 43.7.

During the breaking of the rail, the rail breaker 10 will be oriented substantially in one of the positions illustrated in FIG. 1. FIG. 1 illustrates the substantial increase in available operative positions of breaker 10 over the invention of co-pending application by way of orientating grapple 18 and breaker arm 19 toward the excavator 1 with respect to its mounting on the frame 11. Furthermore, any rails that spring away from breaker 10 will move toward the excavator 1 and not away and out of reach of boom 4. The force exerted by the breaker arm 19 is generally directed in a downwardly, rearwardly, or downwardly and rearwardly direction so that as the pieces of rail are broken off the longer length, these broken-off pieces will simply fall or move downwardly onto the ground without any significant likelihood of encountering anything that could be damaged. Depending upon the arrangement of the cluster of rails R being grasped by the grapple 18, certain of the rails may be broken off over the face portion 47 of the fulcrum blade 42.5 and other of the rails may be broken over the upright face portion 48 of the fulcrum blade. Because of the L-shaped arrangement of the fulcrum blade and of the rails engaging faces 47, 48, the rails are kept under close control and in the proper location for utilizing the full potential of the breaker arm 19.

It should be recognized that during the rail breaking process, all of the jaw plates 28, 29 and 24, 25 will be clamping a length of the rail. The width of the upper jaw 22, between the plates 28 and 29, establishes a substantial length of the rail which is firmly gripped by the upper and lower jaws 22, 21, so that the swinging of the breaker arm 19 will simply cause the rails R to break off at the fulcrum plate 42.5 and the portions of the rail to the right of the grapple 18 will not move appreciably. The portions of the rails which are not being broken at the moment, remain in a right cluster and are held stationary.

After lengths of the rails have been broken over the fulcrum plate 42.5, the grapple 18, which is still in grasping relationship with the rails R, will be swung to the side as the boom structure 4 of the hydraulic excavator 1 is also swing to the side so as to bring another length of rail along the table or pallet so that an additional bite can be taken at the rail. After the rails have been moved along a few feet, the grapple 18 is loosened from the rails and the grapple is swung along the stationary rails to grasp the rails at a new location. Again, six to ten feet of rails will be extending from the grapple 18, past the breaker arm 19 to be broken off again. The grapple 18 is again closed onto the cluster of rails R so that the nicking blade will again produce a nick in the rails opposite the fulcrum plate so that when the breaker arm 19 is again operated, the new lengths of rails will be again broken off at the nick produced and over the fulcrum plate 42.5.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A rail breaker for attachment to the boom structure and hydraulic system of a hydraulic machine, comprising:
   (a) an elongate frame comprising an inner portion and an outer portion;
   (b) upper and lower grapple jaw portions affixed on the outer portion of the frame and having a width to clamp along a length of the rail and immobilize the rail with respect to the frame, at least the upper jaw portion being swingable toward and away from the lower jaw portion to receive a rail transversely therebetween for clamping and releasing the rail with the lower jaw portion;

(c) a powered breaker arm portion swingably mounted on the outer portion of the frame in side-by-side and spaced relation with the grapple jaw portions to engage and break the rail clamped by said jaw portions, the breaker arm being adjacent the upper jaw portion to apply breaking force against the rail and toward the lower jaw portion;

(d) the lower jaw portion comprising a fulcrum portion engageable with the rail, the fulcrum portion comprising a pair of rail engaging face portions extending transversely of each other; and (e) an attachment mounting assembly fixed onto the inner portion of the elongate frame for mounting the frame to the boom structure as to orient the grapple jaw portions and breaker arm portion generally toward the hydraulic machine.

2. A rail breaker according to claim 1 wherein the attachment mounting assembly comprises a pair of brackets affixed onto the inner portion of the frame.

3. A rail breaker according to claim 2 wherein the brackets are parallel and opposing and adapted to connect to a boom structure and an attachment hydraulic cylinder mounted on the boom.

4. A rail breaker according to claim 3 wherein the brackets each have two apertures arranged for connection to the boom structure and the attachment hydraulic cylinder.

5. A rail breaker according to claim 1 wherein nicking means are provided in spaced relation to the breaker arm portion for forming a nick in the rail in order to locate the breaking of the rail.

6. A rail breaker according to claim 5 wherein the nicking means comprises a nicking blade portion on the upper jaw portion.

7. A rail breaker according to claim 1 wherein one of said face portions of the fulcrum portion being oriented to obstruct the shifting of the rail along the lower jaw portion and toward the swing axis of the breaker arm portion.

8. A rail breaker according to claim 7 wherein the breaker arm portion comprises a breaker face portion to confront the rail engaging face portions of the fulcrum portion.

9. A rail breaker according to claim 1 wherein the upper jaw portion comprises a nicking blade portion opposite to the fulcrum portion, the upper jaw portion and nicking blade portion moving toward the fulcrum portion whereby the rail is nicked and broken over the fulcrum at the nicked location.

10. A rail breaker according to claim 1 wherein the upper jaw portion is swingably mounted with respect to the lower jaw portion and frame.

11. A rail breaker according to claim 1 wherein said upper jaw portion and said breaker arm portion both are swingable about adjacent axes.

12. A rail breaker according to claim 11 wherein said swing axes of the upper grapple jaw portion and breaker arm portion are co-linear.

13. A rail breaker according to claim 1 wherein said jaw portions extend from the outer portion of said elongate frame offset from the direction of the elongate frame.

14. A rail breaker according to claim 1 wherein said jaw portions comprise side panel portions spaced from each other in a direction transversely of said elongate frame for engaging and clamping spaced portions of said length of the rail for operation of the breaker arm.

15. A rail breaker according to claim 1 wherein the lower jaw portion comprises a replaceable rail engaging portion adjacent the breaker arm portion and providing a fulcrum portion over which the rail is broken.

16. A rail breaker according to claim 18 wherein said replaceable rail engaging portion is substantially V-shaped to restrict movement of the rails on the lower jaw portion when the rails are clamped by the upper jaw portion.

17. A rail breaker according to claim 1 wherein the jaw portions and the breaker arm portion extend from the outer portion of the elongate frame offset from the direction of the elongate frame.

18. A rail breaker for attachment to the boom structure and hydraulic system of a hydraulic machine, comprising:

(a) an elongate frame comprising an inner portion and an outer portion;

(b) upper and lower grapple jaw portions affixed on the outer portion of the frame endways and offset and having a width to clamp along a length of the rail and immobilize the rail with respect to the frame, at least the upper jaw portion being swingable toward and away from the lower jaw portion to receive a rail transversely therebetween for clamping and releasing the rail with the lower jaw portion;

(c) a powered breaker arm portion swingably mounted on the outer portion of the frame in stationary side-by-side and spaced relation and offset with the grapple jaw portions to engage and break the rail clamped by said jaw portions, the breaker arm being adjacent the upper jaw portion to apply breaking force against the rail and toward the lower jaw portion;

(d) the lower jaw portion comprising a fulcrum portion engageable with the rail, the fulcrum portion comprising a pair of rail engaging face portions extending transversely of each other; and (e) an attachment mounting assembly fixed onto the inner portion of the elongate frame for mounting the frame to the boom structure as to orient the grapple jaw portions and breaker arm portion generally toward the hydraulic machine.

19. A rail breaker for attachment to the boom structure and hydraulic system of a hydraulic machine, comprising:

(a) an elongate frame comprising an inner portion and an outer portion;

(b) upper and lower grapple jaw portions affixed on the outer portion of the frame and having a width to clamp along a length of the rail and immobilize the rail with respect to the frame, at least the upper jaw portion being swingable toward and away from the lower jaw portion to receive a rail transversely therebetween for clamping and releasing the rail with the lower jaw portion;

(c) a powered breaker arm portion swingably mounted on the outer portion of the frame in stationary side-by-side and spaced relation and offset with the grapple jaw portions to engage and break the rail clamped by said jaw portions, the breaker arm being adjacent the upper jaw portion to apply breaking force against the rail and toward the lower jaw portion;

(d) the lower jaw portion comprising a fulcrum portion engageable with the rail, the fulcrum portion comprising a pair of rail engaging face portions extending transversely of each other; and (e) an attachment mounting assembly fixed onto the inner end portion of the elongate frame for mounting the frame to the boom structure as to orient the grapple jaw portions and breaker arm portion generally toward the hydraulic machine further comprising a pair of brackets affixed onto the inner end of the frame wherein the brackets are parallel and opposing and adapted to connect to a boom structure and an attachment hydraulic cylinder mounted on the boom.

20. A rail breaker according to claim 19 wherein the brackets each have two apertures arranged for connection to the boom structure and the attachment hydraulic cylinder.

* * * * *